United States Patent [19]
Kurioka

[11] 3,980,101
[45] Sept. 14, 1976

[54] VALVE FOR SWIVELING FAUCET
[76] Inventor: Takakiyo Kurioka, 15-15, 1-chome, Higashinakamoto, Higashinari, Osaka, Japan
[22] Filed: Apr. 11, 1975
[21] Appl. No.: 567,079

[52] U.S. Cl. .......................... 137/616.5; 251/284; 251/349
[51] Int. Cl.² .................. F16K 31/524; F16K 31/58
[58] Field of Search .......... 137/616.5, 801; 251/77, 251/85, 157, 158, 284, 252, 349, 357

[56] References Cited
UNITED STATES PATENTS

| 401,952 | 4/1889 | Johnson | 137/616.5 |
| 958,716 | 5/1910 | Bard | 251/77 X |
| 1,872,632 | 8/1932 | Brindley | 251/254 X |
| 2,088,666 | 8/1937 | Portl | 251/85 |
| 3,199,833 | 8/1965 | Skinner | 251/357 X |
| 3,592,219 | 7/1971 | Giese | 251/254 X |
| 3,834,665 | 9/1974 | Kurioka | 251/349 |

FOREIGN PATENTS OR APPLICATIONS

| 680,031 | 8/1939 | Germany | 251/357 |
| 21,959 | 8/1904 | United Kingdom | 251/357 |

Primary Examiner—Alan Cohan
Assistant Examiner—Gerald A. Michalsky
Attorney, Agent, or Firm—Armstrong, Nikaido & Wegner

[57] ABSTRACT

Valve for a swiveling faucet having a valve casing, a valve disk inserted in the valve casing and an outlet tube swivelable to operate the valve disk and to thereby open and close a water passage. The valve disk comprises a unitary assembly of a first member, a second member and a soft packing interposed between the first and second members. The second member has a semicircular recessed surface and thick plate-like portions at the opposite ends of the recessed surface respectively. The valve casing is formed with vertical guide channels for guiding the thick plate-like portions of the second member.

3 Claims, 7 Drawing Figures

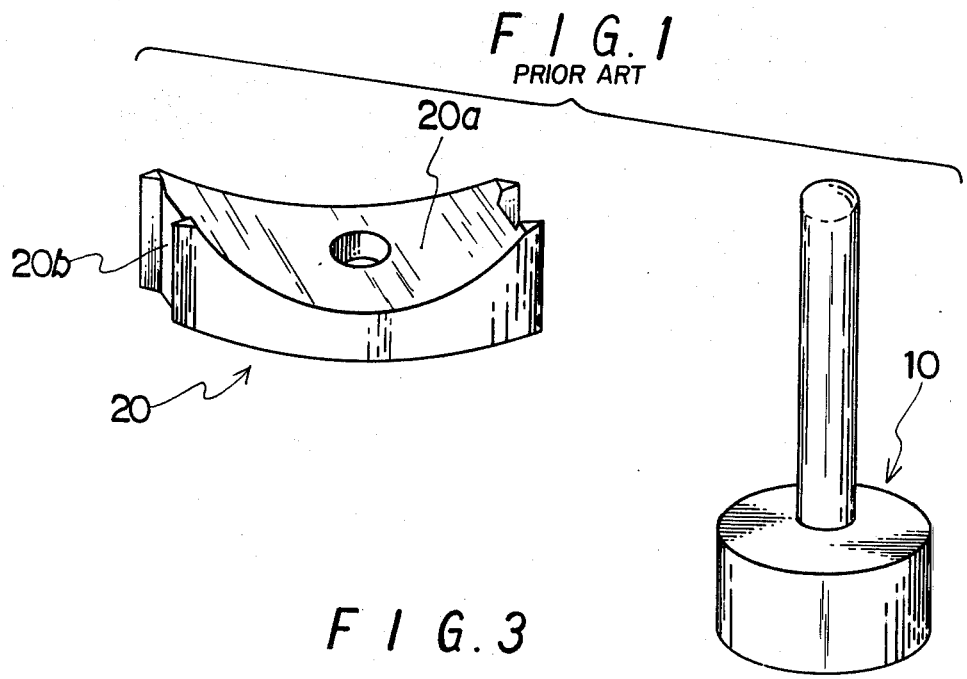
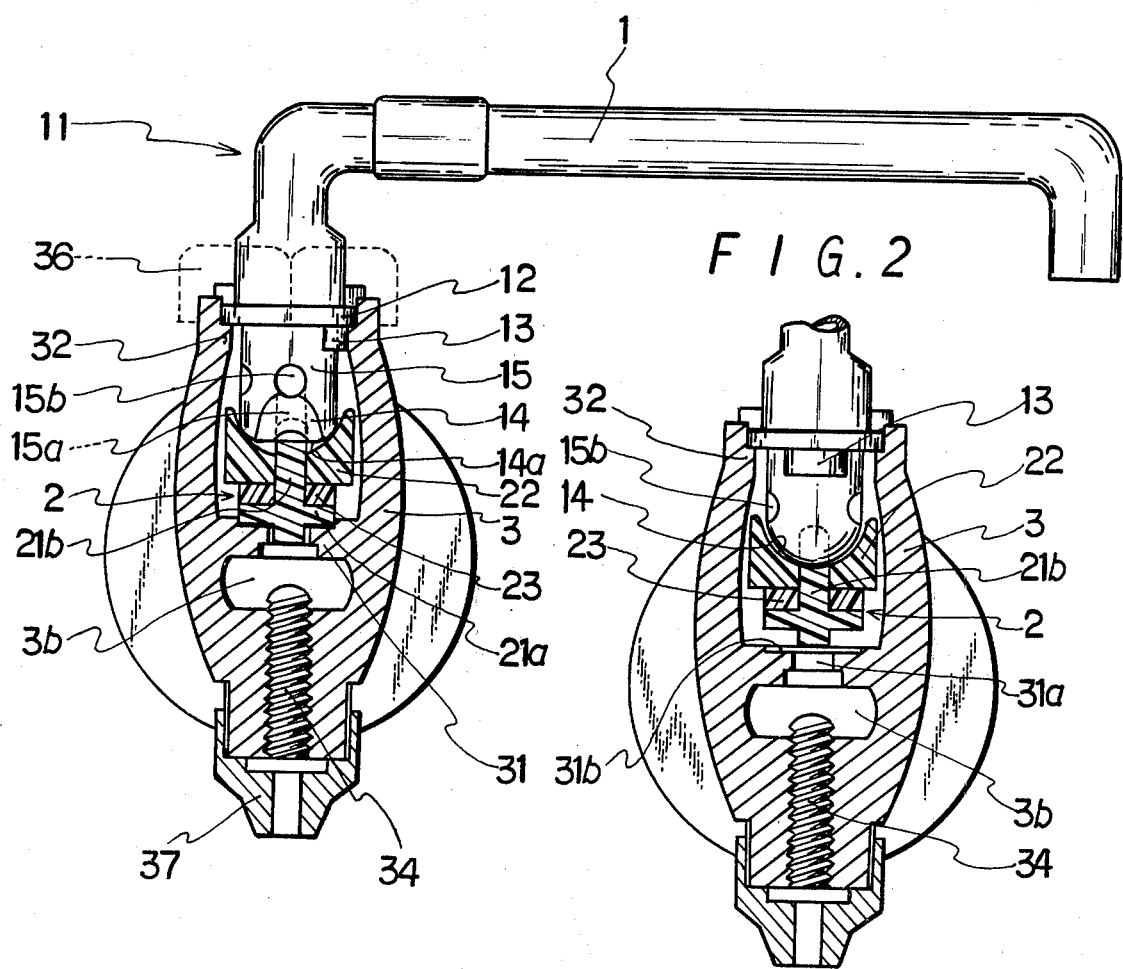

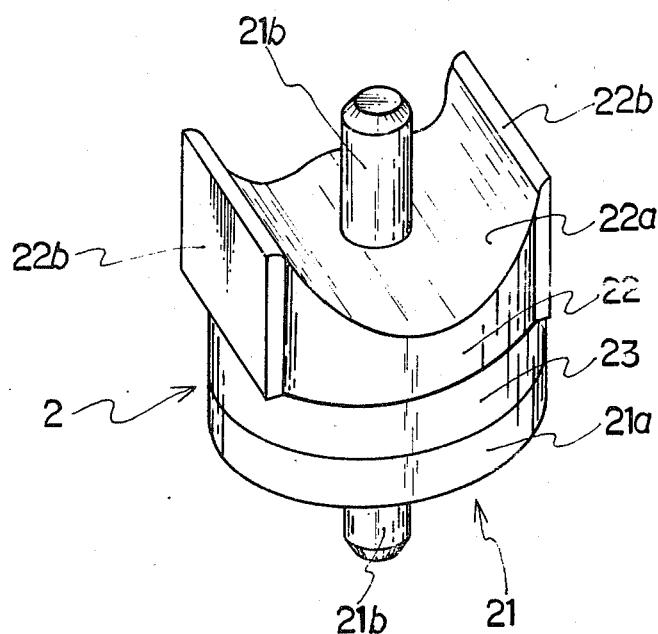
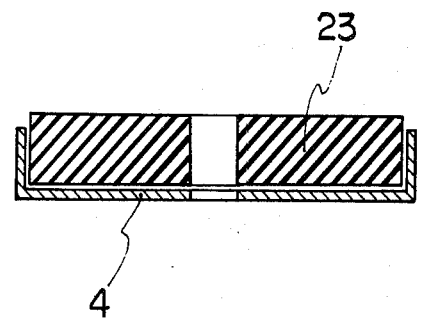
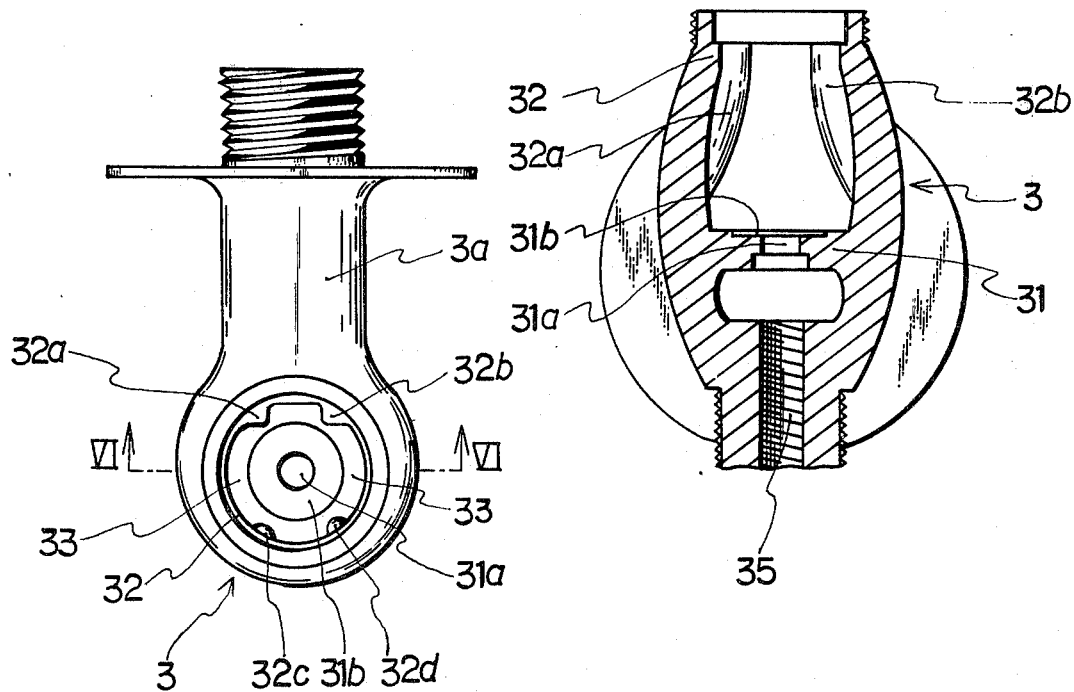

VALVE FOR SWIVELING FAUCET

SUMMARY OF THE INVENTION

This invention relates to a novel valve for a swiveling faucet, and more particularly to a valve for use in such faucet which is made smoothly operable to open and close the water passage by the improvements in the construction of valve disk and valve casing.

BACKGROUND OF THE INVENTION

The present inventor has already accomplished an invention relating to a swiveling faucet and filed Japanese Patent Application No. 96625/1971 and U.S. Pat. No. 3,834,665. The faucet of the invention includes a water outlet tube which is swivelable to open and close the water passage and a valve disk comprising a first member 10 and a second member 20 as shown in FIG. 1. The outlet tube is provided, at its base end, with a cylindrical member having a semicircular curved surface. When turned, the cylindrical member depresses the second member, with the laterally horizontal projecting portion of its curved surface in contact therewith, to close the valve or relieves the second member of the pressure to open the valve. According to the invention, the second member must be formed with a semicircular recessed surface 20a adapted for full face-to-face contact with the semicircular curved surface of the cylindrical member and opposite side guide channels 20b to render the second member movable up and down. The guide channels 20b are therefore defined by thin wall portions. This construction involves the problem that when the laterally horizontal portion depresses the second member, the thin wall portions become distorted and interfere with projecting guide pieces formed on the inside of the valve casing and extending axially thereof to guide the second member, consequently hampering smooth valve opening and closing operation. In addition to the guide pieces, the valve casing further has stoppers disposed at an upper interior portion thereof and spaced apart from each other by a distance to permit the cylindrical member to turn through an angle of 180°. Thus the construction has another problem in that these guide pieces and stoppers impede insertion of the second member into the casing, making it difficult to smoothly place the second member thereinto. Furthermore because the valve disk is adapted to restrict the pressure of water only with the elasticity of the first member, the packing or the first member may possibly be damaged when subjected to an excessive depressing force, this leading to leakage of water. These are problems experienced with the valve of the type described.

OBJECTS OF THE INVENTION

An object of this invention is to provide a valve for a swiveling faucet which is easy to handle and smoothly operable.

Another object of this invention is to provide a valve having a valve disk and a valve seat which are protected from damage.

Other objects of this invention will become apparent from the following description given with reference to the accompanying drawings.

BRIEF DESCRIPTION OF THE DRAWINGS

FIG. 1 is a perspective view showing valve disk members used in a conventional valve;

FIG. 2 is a view partly in vertical section showing a valve of this invention in its opened state;

FIG. 3 is a view partly in vertical section showing the valve of this invention in its closed state;

FIG. 4 is a perspective view showing a valve disk assembly;

FIG. 5 is a plan view showing a valve casing;

FIG. 6 is a view in section taken along the line VI—VI in FIG. 5; and

FIG. 7 is a view in section showing a modified soft packing for use in the valve assembly of this invention.

DETAILED DESCRIPTION OF THE INVENTION

FIGS. 2 to 6 show a swiveling outlet tube 1, a valve disk assembly 2 and a valve casing 3 having the swiveling outlet tube 1 connected thereto and the valve disk assembly 2 disposed therein. The outlet tube 1 has a downwardly bent base end 11 formed with a flange 12 on the outer periphery of an intermediate portion thereof and an abutting member 13 beneath the flange 12. The base end 11 further includes a cylindrical member 15, the lower end of which has a semicircular curved surface 14. The lowermost projecting portion, namely the extremity, of the semicircular-surfaced lower end is positioned immediately below the abutting member 13. A vertical passage 15a and a lateral passage 15b, both communicating with the outlet tube 1, extend through the cylindrical member 15. The valve disk assembly 2 comprises a first member 21, a second member 22 and a soft packing 23 interposed therebetween. These members and packing are all made of hard synthetic rubber, and the first member 21 and second member 22 have higher hardness than the soft packing 23. More specifically, the material of the first and second members 21, 22 has a hardness of about 75° to about 95°, whilst the soft packing 23 is made of a material having a hardness of about 70° to about 90°. Thus the difference in hardness between the materials is about 5 to about 20 degrees. The hardness was measured by the hardness tester made by Kori Seiki Ltd. in Tokyo, Japan. The first member 21 includes a disk 21a and a stem 21b integral with the disk. The second member 22 and soft packing 23 are placed on the stem 21b and are thereby joined to the first member 21. The second member 22 has a recessed upper surface 22a curved in a semicircular shape and adapted for full face-to-face contact with the semicircular curved surface 14 of the cylindrical member 15. The second member 22 has thick plate-like guide potions 22b at its opposite ends. The valve casing 3, which is tubular, includes a partition 31 at its lower central portion and a circular projecting edge 32 at its upper portion for receiving the flange 12 so as to render the cylindrical member 15 freely turnable when it is inserted into the valve casing 3. The partition 31 defines a compartment 3b and has a small central water passage 31a. Water flows into the compartment 3b from a water supply tube 3a integral with the valve casing 3 and is passed through the passage 31a into the outlet tube 1. Formed in the upper surface of the partition 31 is a valve seat 31b against which the under surface of the disk 21a of the first member 21 is pressed when the valve is closed. The valve casing 3 has projecting stoppers 32a and 32b integral with the circular projecting edge 32 and extending axially of the casing 3. The stoppers are spaced apart from each other by a distance to permit the abutting member 13 to turn through an angle of 180°. The valve casing 3 further has projections 32c and 32d extending axially of the casing and opposite to each other. The stoppers 32a, 32b and 32c, 32d define two vertical channels 33 for guiding the guide portions 22b of the valve disk assembly 2. In order to render the abutting member 13 turnable free of interference, the upper ends of the projections 32c and 32d are lower than those of the stoppers 32a and 32b. The valve disk assembly 2 is disposed in vertically movable manner, the first member 21 down, with the stem 21b inserted in the vertical passage 15a in the cylindrical member 15 as shown in FIGS. 2 and 3. The distance between lower end of the cylindrical member 15 and the partition 31 is slightly larger than the length between lower end of the recessed upper surface 22a and the under surface of the disk 21a. When the cylindrical member 15 is turned, the projecting portion (seen in the form of a horizontal line 14a in FIG. 3) of the semicircular curved surface 14 of the cylindrical member 15 depresses the second member 22 in pressing contact with the opposite side ends of its recessed curved surface 22a, bringing the lower surface of the disk 21a of the first member 21 into intimate contact with the valve seat 31b in the partition 31 to close the small water passage 31a. When reversely turned, the cylindrical member 15 opens the water passage 31a again. A threaded rod 34 for regulating the flow of water is screwed in a threaded bore 35 formed in the bottom of the valve casing 3. Upward or downward shifting of the threaded rod 34 varies the flow rate of water into the central water passage 31a. Indicated at 36 is a nut for fastening the outlet tube 1, and at 37 a box nut for preventing water leakage from the bottom of the valve casing.

The valve described above operates in the following manner. When the abutting member 13 is positioned at the center of the space between the stoppers 32a and 32b, the flow of water passing through the central water passage 31a pushes up the valve disk assembly 2, holding the recessed curved surface 22a of the second member 22 in substantially full face-to-face contact with the curved surface 21a of the cylindrical member 15. Water therefore flows between the valve disk assembly 2 and valve casing 3, then through the lateral passage 15b and into the outlet tube 1, from which it is run off. When the outlet tube 1 in this state is turned rightward through 90° until the abutting member 13 contacts the stopper 32b (or leftward through 90° to bring the member 13 into contact with the stopper 32a), the lowermost projecting portion 14a of the cylindrical member 15 depresses the opposite side ends of the curved recessed surface 22a of the valve disk assembly 2, bringing the disk 21a into intimate contact with the seat 31b to stop the outflow of water. Because the second member 22 of this invention includes the thick plate-like portions 22b at the opposite ends of the recessed surface 22a, the second member 22 functions smoothly free of any deformation when pressed by the cylindrical member 15, unlike the conventional disk member including thin wall portions. Moreover, the valve disk assembly can be inserted into the valve casing 3 with great ease simply by fitting the thick plate-like portions 22b into the vertical guide channels 33, since the present structure does not include an obstacle unlike the known structure. If a greater depressing force than is needed to stop the flow of water is applied to the valve disk assembly 2 when closing the valve, the soft packing 23 interposed between the first member 21 and the second member 22 releases the excess force to protect the disk 21a of the first member 21 from damage. The interposed soft packing 23, which absorbs impact, also prevents the occurrence of water impact even when the disk is abruptly depressed. The provision of the soft packing 23 makes it possible to increase the curvature of recessed curved surface 22a of the second member 22. This permits an increase in the axial displacement of the valve disk assembly 2 (i.e. the distance between the partition 31 and the first member 21a) which opens the valve, consequently preventing the reduction of water pressure. Whereas an increase in the curvature of the corresponding member of conventional valves adds to the resistance involved in the turning movement of water outlet tube 1 and renders the tube inoperable, the soft packing 23 used in this invention axially bends when the outlet tube 1 is turned to thereby mitigate the resulting resistance. The outlet tube 1 is therefore smoothly movable in spite of the increase of the curvature, and the valve disk assembly 2 is axially shiftable until the bottom of the recessed curved surface 22a comes into contact with the projecting curved surface 14 of the cylindrical member 15, giving an increased distance between the partition wall 31 and the first member 21a. Accordingly, the flow resistance lowers to prevent the reduction of water pressure.

The soft packing 23 may have the structure shown in FIG. 7 in which the periphery and bottom of the packing 23 are covered with a hollow cylindrical member 4 U-shaped in section. The packing can then be made of a softer material than the one already described. This type of packing makes the disk 21a less prone to damage and more durable against the impact of water.

The objects of this invention and the construction and advantages of the valve of the invention will be apparent from the foregoing description. The invention is not limited to the specific embodiment described but of course includes various modifications within the scope of the appended claims.

I claim:

1. In a swiveling faucet having a valve casing, a valve disk inserted in said valve casing and an outlet tube swivelable to operate said valve disk and to thereby open and close a water passage, said outlet tube including a cylindrical member at the lower portion thereof with a semicircular curved surface formed on the end thereof, a valve comprising said valve disk including an assembly of a first member, a second member and a soft packing interposed between said first and second members, said second member having a semicircular recessed surface adapted for substantially full face-to-face contact with said semicircular curved surface formed on said cylindrical member at the lower portion of the outlet tube, said second member including thick plate-like guide means at the opposite ends of said semicircular recessed surface respectively, and said valve casing formed with vertical guide channels for guiding the thick plate-like guide means of said second member.

2. A valve as defined in claim 1 wherein said guide channels are defined by projecting stoppers spaced apart by a distance to permit said outlet tube to turn through an angle of 180° and projections formed in opposing relation to said stoppers, said stoppers and projections extending axially of said valve casing.

3. A valve as defined in claim 1 wherein the periphery and bottom of said soft packing are covered with a hollow cylindrical member U-shaped in section.

* * * * *